United States Patent
Chen et al.

(10) Patent No.: US 10,977,284 B2
(45) Date of Patent: Apr. 13, 2021

(54) TEXT SEARCH OF DATABASE WITH ONE-PASS INDEXING INCLUDING FILTERING

(71) Applicant: ENTIT SOFTWARE LLC, Sanford, NC (US)

(72) Inventors: Qiming Chen, Sunnyvale, CA (US); Meichun Hsu, Sunnyvale, CA (US); Malu G. Castellanos, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 215 days.

(21) Appl. No.: 16/070,895

(22) PCT Filed: Jan. 29, 2016

(86) PCT No.: PCT/US2016/015679
§ 371 (c)(1),
(2) Date: Jul. 18, 2018

(87) PCT Pub. No.: WO2017/131753
PCT Pub. Date: Aug. 3, 2017

(65) Prior Publication Data
US 2019/0034523 A1 Jan. 31, 2019

(51) Int. Cl.
*G06F 16/33* (2019.01)
*G06F 16/31* (2019.01)
(Continued)

(52) U.S. Cl.
CPC ........ *G06F 16/3338* (2019.01); *G06F 16/243* (2019.01); *G06F 16/24542* (2019.01); *G06F 16/319* (2019.01); *G06F 16/3341* (2019.01)

(58) Field of Classification Search
CPC ............. G06F 16/3338; G06F 16/3341; G06F 16/243; G06F 16/319; G06F 16/24542
(Continued)

(56) References Cited

U.S. PATENT DOCUMENTS 4,965,763 A * 10/1990 Zamora ................... G06F 16/30
704/1
5,692,176 A * 11/1997 Holt ..................... G06F 16/3346
(Continued)

FOREIGN PATENT DOCUMENTS

| CN | 102033954 A | * | 4/2011 |
| EP | 0280866 A2 | | 9/1988 |
| WO | WO-2012080080 | | 6/2012 |

OTHER PUBLICATIONS

Su et al., "Performance Evaluation of Relational Implementations of Inverted Text Index", Dec. 5, 2002, 8 pages, accessed online at <https://web.stanford.edu/class/archive/cs/cs276a/cs276a.1032/projects/reports> (previously cited and provided by Applicant) (Year: 2002).*

(Continued)

*Primary Examiner* — Phuong Thao Cao (57) ABSTRACT

A system and method for a text search of a database. A text search expression is converted to a query plan having multiple search tokens. A one-pass indexing of an invested word index filters the inverted word index based on a search condition and identifies the applicable documents having the multiple search tokens.

18 Claims, 6 Drawing Sheets

(51) Int. Cl.
*G06F 16/2453* (2019.01)
*G06F 16/242* (2019.01)

(58) Field of Classification Search
USPC .......................................................... 707/706
See application file for complete search history.

(56) References Cited

U.S. PATENT DOCUMENTS

| | | | | |
|---|---|---|---|---|
| 5,757,983 | A * | 5/1998 | Kawaguchi | G06K 9/62 |
| | | | | 382/305 |
| 5,819,258 | A * | 10/1998 | Vaithyanathan | G06F 16/355 |
| | | | | 707/692 |
| 6,105,023 | A * | 8/2000 | Callan | G06F 16/319 |
| 6,212,517 | B1 * | 4/2001 | Sato | G06F 16/313 |
| | | | | 707/749 |
| 7,305,414 | B2 | 12/2007 | Manikutty | |
| 7,409,406 | B2 | 8/2008 | Agrawal | |
| 7,496,568 | B2 * | 2/2009 | Broder | G06F 16/334 |
| 7,634,468 | B2 * | 12/2009 | Stephan | G06F 16/319 |
| 7,702,614 | B1 * | 4/2010 | Shah | G06F 16/319 |
| | | | | 707/741 |
| 7,765,216 | B2 | 7/2010 | Li | |
| 7,814,099 | B2 * | 10/2010 | Wang | G06F 16/951 |
| | | | | 707/730 |
| 7,840,609 | B2 * | 11/2010 | Chandrasekar | G06F 16/8365 |
| | | | | 707/804 |
| 7,882,122 | B2 | 2/2011 | Wong | |
| 8,312,023 | B2 | 11/2012 | Shields | |
| 8,606,808 | B2 * | 12/2013 | Srikrishna | G06F 16/3322 |
| | | | | 707/767 |
| 8,745,061 | B2 | 6/2014 | Austermann | |
| 8,782,061 | B2 | 7/2014 | Agrawal | |
| 9,026,538 | B2 | 5/2015 | Promhouse | |
| 9,165,056 | B2 * | 10/2015 | Consul | G06F 16/334 |
| 9,501,475 | B2 * | 11/2016 | Agrawal | G06F 16/93 |
| 9,507,827 | B1 * | 11/2016 | Poutanen | G06F 16/319 |
| 2001/0049677 | A1 * | 12/2001 | Talib | G06F 16/367 |
| 2004/0205044 | A1 * | 10/2004 | Su | G06F 16/319 |
| 2006/0069982 | A1 * | 3/2006 | Petriuc | G06F 16/951 |
| | | | | 715/205 |
| 2007/0038665 | A1 * | 2/2007 | Kwak | G06F 16/972 |
| 2007/0079254 | A1 * | 4/2007 | Kwak | G06F 16/148 |
| | | | | 715/803 |
| 2008/0222117 | A1 * | 9/2008 | Broder | G06F 16/334 |
| 2009/0037369 | A1 * | 2/2009 | Chandrasekar | G06F 16/8365 |
| 2009/0083214 | A1 * | 3/2009 | Konig | G06F 16/313 |
| 2009/0100022 | A1 * | 4/2009 | Nayak | G06F 16/338 |
| 2009/0319500 | A1 | 12/2009 | Agrawal et al. | |
| 2010/0049705 | A1 * | 2/2010 | Ochi | G06F 16/93 |
| | | | | 707/727 |
| 2010/0082633 | A1 * | 4/2010 | Harbarth | G06F 16/81 |
| | | | | 707/741 |
| 2010/0211572 | A1 * | 8/2010 | Beyer | G06F 16/951 |
| | | | | 707/742 |
| 2010/0257161 | A1 | 10/2010 | Kemp et al. | |
| 2010/0318519 | A1 * | 12/2010 | Hadjieleftheriou | G06F 16/319 |
| | | | | 707/742 |
| 2011/0055192 | A1 * | 3/2011 | Tang | G06F 16/951 |
| | | | | 707/706 |
| 2011/0066623 | A1 * | 3/2011 | Weissman | G06F 16/951 |
| | | | | 707/742 |
| 2011/0106797 | A1 * | 5/2011 | Palakodety | G06F 16/951 |
| | | | | 707/728 |
| 2011/0119207 | A1 * | 5/2011 | Tong | G06Q 30/0283 |
| | | | | 705/400 |
| 2013/0103657 | A1 * | 4/2013 | Ikawa | G06F 16/2477 |
| | | | | 707/693 |
| 2013/0151561 | A1 * | 6/2013 | Pfeifle | G06F 16/2468 |
| | | | | 707/780 |
| 2013/0212092 | A1 | 8/2013 | Dean et al. | |
| 2013/0238584 | A1 * | 9/2013 | Hendry | G06F 16/319 |
| | | | | 707/706 |
| 2013/0268526 | A1 * | 10/2013 | Johns | G06F 16/954 |
| | | | | 707/730 |
| 2013/0275454 | A1 * | 10/2013 | Pfeifle | G06F 16/29 |
| | | | | 707/769 |
| 2014/0279871 | A1 * | 9/2014 | Ochoa | G06F 16/273 |
| | | | | 707/610 |
| 2014/0280086 | A1 * | 9/2014 | Bouadjenek | G06F 16/2228 |
| | | | | 707/723 |
| 2014/0351274 | A1 * | 11/2014 | Agrawal | G06F 40/295 |
| | | | | 707/754 |
| 2016/0246851 | A1 * | 8/2016 | Abe | G06F 16/3334 |
| 2016/0275178 | A1 * | 9/2016 | Liu | G06F 16/951 |
| 2017/0097936 | A1 * | 4/2017 | Glover | G06F 16/2425 |

OTHER PUBLICATIONS

Huston et al., "Efficient Indexing of Repeated n-Grams", in Proceedings of the fourth ACM International Conference on Web Search and Data Mining (WSDM '11), New York, NY, USA, 2011, pp. 127-136. (Year: 2011).*

Zobel et al., "Inverted Files for Text Search Engines", ACM Computing Surveys, vol. 38, No. 2, Article 6, Jul. 2006, pp. 1-56. (Year: 2006).*

International Searching Authority, "Notification of Transmittal of the International Search Report and the Written Opinion", PCT/US2016/015679, Oct. 27, 2016 10 pages.

* cited by examiner

TEXT SEARCH OF DATABASE WITH ONE-PASS INDEXING INCLUDING FILTERING

BACKGROUND

Electronic or digital databases are generally a repository of information and data. A database may be an organised collection of data, and may be the collection of schemas, tables, queries, reports, views and other objects. The data may be organised to support processes benefitting from the information. The database may be structured to facilitate organizations or entities to access and retrieve information of data from the database. However, text search of databases can be slow and resource intensive, especially with large databases and the ever-increasing amount of data. As technology advances, there is an ongoing need to provide more reliable and efficient service in the provision of data including with respect to text searching of databases.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Examples of the present techniques include a text search of a database via a search portal or text search engine, including receiving a text search expression (e.g., words) and a search condition (e.g., a time frame). The text search expression is converted to a query plan having multiple search tokens. Each search token may correspond to a respective word in the text search expression. To implement the text search, a one-pass indexing comprising a single-scan is performed. In the text search, the one-pass indexing filters an inverted or inverse word index (inverse index table) of the database based on the search condition so to note the documents listed in the inverted word index satisfying the search condition. In the process, the one-pass indexing in the single scan identifies which of these applicable documents (satisfying the search condition) have the multiple search tokens.

Embodiments include a system and method for a text search of a database, including, receiving a text search expression and a search condition. The text search expression is converted to a query plan having multiple search tokens. A one-pass indexing of an inverted or inverse word index (e.g., a single-pass scan of the inverse word index) both (1) filters the inverse word index based on the search condition and (2) identifies the applicable documents having the multiple search tokens. The action (2) may benefit from action (1), such as in the single scan.

Thus, examples are generally directed to text search of a database. Again, a text search expression is converted into a query plan, and then implemented via an inverse word index and a search condition(s). The starch condition is a filter condition (e.g., a time stamp) for the documents in the database. The text search expression is converted (transformed, rewritten, etc.) into a search query plan (e.g., in SQL) to access the index table and base tables. A "text-search SQL-query generator" may provide for the conversion. With this conversion to SQL, the direct leveraging of SQL operators in the text search may be realized.

A keyword of the text search may be a search token in the query or query plan. Further, the technique is uniquely a single-pass of the inverse word index (or inverse index table) and may avoid multi-pass or self-joins which are typically resource intensive. The single pass may a match-count based scan, as discussed below. Moreover, the single-pass generally skips documents not meeting the filter condition, saving additional resources in the execution of the text search. Such may be characterized as a "handshake" or "handshake mechanism" of the one-pass with the filter condition. Lastly, the technique (e.g., including a search portal or text search engine) may sit atop a database management system.

In SQL query-based text search, the purpose of indexing may be to find all the document IDs matching the search request. In other words, the index search may provide a filter for the documents. An inverted index search may be a particular action of text search. In addition to the search request, e.g. expressed by a list of keywords, there may be an application that filters specific conditions, such as time-stamp, on the documents. The use of these conditions to filter documents may constitute another action of text search. Treating these two actions (e.g., inverted index search and filtering specific conditions) individually may prohibit the two actions to benefit with respect to each other, i.e., no synergy. In contrast, certain embodiments herein may provide for a SQL query-based text search employing a handshake or handshake mechanism, namely, embedding the application specific SQL conditions into the inverse index search, and thus with the filter of the index itself generally providing for enhanced indexing efficiency. This way, while the documents are filtered through indexing, the indices are additionally filtered by the application specific condition defined on the documents. These actions may benefit mutually.

As a simple example, assume the base table contains 100 M logs for 100 days, for any given search expression, the indexing step need to deal with 100 M doc_ids. However, if a condition on the base table specifies a time range of 1 day, thus the doc_ids may be filtered to roughly 1 M (instead of 100 M); if this filtering result can be used by the index search, then only 1 M doc_ids should be taken into account in the indexing step. With the handshake mechanism the above problem can be solved within a single query where querying base table and querying index table are filtered interactively using each other's filter conditions. The search queries composed under this mechanism may over-perform others without the handshake. In summary, in text search, treating filter documents using inverted index and using application specific conditions, which are not specified in the search expression, as separate actions, tends to be the cause of inefficiency. Conversely, examples herein may provide solutions to address this issue in SQL query-based text search, in terms of embedding SQL conditions defined on the documents into the index search and, therefore, filter the index itself for enhanced indexing efficiency.

Relational databases store data in tables having columns (fields) and rows (records or tuples), and such that files or documents can be queried simultaneously. Thus, the relational database may organize data into one or more tables (or "relations") of columns and rows, with a unique key identifying each row. Indeed, a relational database may be a collective set of multiple data sets organized by tables, records and columns, and establish a relationship between database tables. Each table record (or row) may contain a unique data instance defined for a corresponding column category, and functional dependencies may be formed: one to one; one to many; many to one; and many to many. The relational database may perform "select", "project" and "join" database operations, where select is used for data retrieval, project identifies data attributes, and join combines relations.

Relational databases may be created, maintained, and accessed using structured query language (SQL) or similar language. The SQL standard specifies the syntax that a conforming database system may implement. However, the standard's specification of the semantics of language constructs may vary. SQL was adopted as a standard by the American National Standards Institute (ANSI) in 1986 as SQL-86 and the International Organization for Standardization (ISO) in 1987. The standard is subject to continuous improvement.

A common operation in SQL, the query, makes use of the declarative SELECT statement. SELECT retrieves data from one or more tables, or expressions. Standard SELECT statements have no persistent effects on the database. Some non-standard implementations of SELECT can have persistent effects, such as the SELECT INTO syntax provided in some databases. Queries allow the user to describe desired data, leaving the database management system (DBMS) to carry out planning, optimizing, and performing the physical operations necessary to produce that result as it chooses. A query includes a list of columns to include in the final result, normally immediately following the SELECT keyword. An asterisk ("*") can be used to specify that the query should return all columns of the queried tables. SELECT is the most complex statement in SQL, with optional keywords and clauses that include various clauses. The FROM clause, which indicates the table(s) to retrieve data from. The FROM clause can include optional JOIN subclauses to specify the rules for joining tables. The WHERE clause includes a comparison predicate, which restricts the rows returned by the query. The WHERE clause eliminates all rows from the result set where the comparison predicate does not evaluate to True. Several other SQL clauses are applicable. Moreover, while the discussion herein may focus on SQL at times, other query procedures as alternatives to SQL are applicable.

A database index may be a data structure that improves the speed of data retrieval operations on a database table at the cost of additional writes and storage space to maintain the index data structure, indexes are used to locate data without having to search every row in a database table every time a database table is accessed indexes can be created using one or more columns of a database table, providing the basis for both rapid random lookups and efficient access of ordered records. An index may be a copy of select columns of data from a table that can be searched efficiently and that may also include a low-level disk block address or direct link to the complete row of data.

An inverted index, or also referred to as an inverted word index, inverse word index, inverted index table, inverse index table, inverted word file, postings file, inverted file, etc. is an index data structure storing a mapping from content, such as words or numbers, to its locations in a database file, or in a document or a set of documents. The inverted index is named in contrast to a forward index which maps from documents to content. There are at least two variants of inverted indexes; a record level inverted index (or inverted file index or just inverted file) that contains a list of references to documents for each word. A word level inverted index (or full inverted index or inverted list) additionally contains the positions of each word within a document. The latter form offers more functionality (like phrase searches), but needs more processing power and space to be created.

The inverted index data structure may be a central component of a typical search engine indexing. A goal of a search engine implementation may be to optimize the speed of the query in finding the documents where word X occurs. Once a forward index is developed, which stores lists of words per document, the forward index may be inverted to develop an inverted index. Querying the forward index would require sequential iteration through each document and to each word to verify a matching document. The time, memory, and processing resources to perform such a query are not always technically realistic. Instead of listing the words per document in the forward index, the inverted index data structure is developed which lists the documents per word. With the inverted index created, the query can be resolved by jumping to the word id (via random access) in the inverted index.

Examples of the present techniques include a new technique for query-based (e.g., SQL query-based) text search using an inverse word index. Additional, the search portal or engine may directly leverage SQL queries to do text search. This may differ from other text search engines built in a language having nothing to do with SQL, or which have search operators, coded, say in C++ programming, included in the set of SQL operators. Conventionally, these search operators themselves are not built using SQL query, and therefore do not leverage the SQL analytics power directly. In contrast, certain examples herein may include in the engine a text-search SQL-query generator for turning (e.g., automatically) a search expression into the corresponding search queries in SQL, for accessing the index tables and bass-tables of the database. In this context, specific issues of "SQL algorithms" may be addressed. Moreover, as mentioned, some examples include the new search portal on top of a database management system.

As indicated, to speed up database based text search, inverse indices are often provided as index tables. An index table may contain at least the fields of search token and document identification (id) "doc_id," and is normalized. To find the documents matching M search tokens specified in the search expression, the search query typically performs M-way self-join of the index_table. A multi-way self-join based index search may be referred to as Multi-Pass indexing (MP). While MP is a basic form of using inverse index, MP generally has the overhead of scanning the index table multiple times. Because the index table is typically too large to be cached in memory, such overhead significantly impacts the text search efficiency.

To avoid such multi-pass indexing overhead, examples herein employ a One-Pass (1P) indexing scheme that may identify the matched doc_ids (e.g., all of the matched doc_ids) in a single index table scan. The 1P scheme generally does not start with directly checking whether a document matches all the search tokens, but instead may start with checking whether a document matches any search token and then counting the number of matches. In this sense, the 1P scheme is match-count based. Because the 1P indexing process scans the index table typically only once, the 1P generally out-performs the MP procedure that scans the index table multiple times. As shown below with respect to executed Examples, the 1P indexing for turning multi-pass index scans to 1-pass index scan in text search, may provide significant advantage in enhancing text search performance.

Text search in relational databases has been supported by several database vendors that facilitate users to retrieve from the database the contents listed a text field containing specific keywords or phrase within a table. To speed up text search, inverse indices are often utilized. As mentioned, an inverse index or a word index table may contain at least two columns; the word token and the ID (e.g. doc_id) of the document containing that token. In general, the inverse index or text index table may contain the words, case insensitive or sensitive, appearing in base table's text field. The text index may be like other tables in the database except the text index table may be linked to the base table(s) internally.

A search request may be expressed by a search expression that contains a list of keyword tokens or a phrase. To search a text field in the base table(s) that matches the search expression, the search may identify the doc_ids of the matching documents through querying the index table, which may be filtered by the possible conditions defined on the base-table. Note that each <token, doc_id> pair may be distinct in the search query. If this not the case in the index table for some reason, the distinct <token, doc_id> should be extracted in the search query. For example, assume the documents are stored in the "base_table" with fields "unique_id," "text," . . . etc., the word indices are stored in the index_table with two fields: "token" and "doc_id" with instances:

| token | doc id |
|-------|--------|
| cat   | 1      |
| cat   | 324    |
| dog   | 10987  |
| ...   |        |
| time  | 324    |
| time  | 998    |
| ...   |        |

The simple search expression may be a list of keywords or keyword tokens. A document containing all these tokens matches the search expression which is tested by querying the index table. If the search is phrasal oriented, the keyword tokens tokenized from the phrase may be tested initially, and if a document matches all the tokens, the existence of the phrase containing these tokens is further validated. In general, using index can reduce the validation process for enhanced performance. For instance, given a document having "Resource management transaction response time exceeds the preset limit," the document matches the search expression "transaction response time" because all three keywords "transaction," "response," and "time" are contained in the document. Extended and more complicated search patterns may be applicable.

To extract the documents (identified by the id) which contain the keywords 'transaction', 'response', 'time', the typical query looks like the following, which self-joins the index_table 3 times for testing the matching of the 3 keywords for each doc_id in the index_table, and then use them as the id of the base_table for querying the base_table. In the index based text search introduced above, the fundamental query shape is the multi-way join of the index table for identifying the document IDs matching the given search tokens. In the above query, given 3 tokens 'transaction', 'response', 'time', it conducts a 3-way self join of the index table to find the doc_ids matching all the 3 tokens. The other way to express such 3-way join is given below.

[MP1 Query]

```
SELECT * FROM base_table WHERE
    id IN (SELECT doc_id FROM index_table WHERE
        token = 'transaction')
    AND id IN (SELECT doc_id FROM index_table WHERE
        token = 'response')
    AND id IN (SELECT doc_id FROM index_table WHERE
        token = 'time');
```

Such may be referred to as a multi-way self-join based index search and as Multi-Pass indexing. The MP query may have other shapes, such as the shape MP2 shown below.

[MP2 Query]

```
SELECT * FROM base_table WHERE unique_id
IN (SELECT t0.doc_id
    FROM index_table t0, index_table t1, index_table t2
    WHERE t0.doc_id=t1.doc_id AND t1.doc_id=t2.doc_id
    AND t0.token = 'transaction' AND t1.token = 'response'
    AND t2.token = 'time').
```

Another query shape is based on the count of matches. Given N distinct search keywords, a document matches any of them gets one count, and a document may not get more than one count on any token in the index table since these tokens are distinct, that is the pair of <token, doc_id> is distinct. Therefore, a document gets N count of match all the keywords. We disclosed this 1P query shape separately and do not discuss its detail here.

[1P Query]

```
SELECT * FROM base_table WHERE(unique_id IN
    (SELECT doc_id FROM
        (SELECT doc_id, COUNT(*) AS count FROM index_table
            WHERE token IN ('transaction' 'response', 'time')
            GROUP BY doc_id
        ) r
        WHERE count>=3)
).
```

The use of 1P scheme may employ that all the <token, doc_id> pairs to be distinct. In case the index table has additional field such as the "position" of the token appearing in the document, the above query may be modified to one of the following forms.

[1P Query]

```
SELECT * FROM base_table WHERE (unique_id IN
    (SELECT doc_id FROM
```

```
-continued

[1P Query]

(SELECT doc_id, COUNT(*) AS count FROM index_table
    WHERE token IN ('transaction', 'response', 'time')
    GROUP BY doc_id
) r
WHERE count>=3)
).
```

While MP is a basic form of using inverse index, MP has the overhead of searching the index table multiple times. From a theoretical point of view, MP may be based on set intersection, namely, for M keyword tokens, to obtain the set of doc_ids meeting each token, and then takes the intersection of these sets as the final result. Because each set is obtained by a pass retrieval of the index table, MP typically requires retrieving the index table multiple times. Since the index table is usually too large to be cached in memory, such overhead significantly impacts the text search efficiency.

To avoid such multi-pass indexing overhead, the One-Pass (1P) indexing scheme is introduced and that may be able to identify all the matched doc_ids in a single index table search. The 1P scheme generally does not start with directly checking whether a doc matches all the particular search tokens, but instead may start with checking whether the doc matches any search token, then counting the number of matches. In other words, the 1P procedure may work in the following way:

Given m tokens t1, t2, . . . , tm, in a single scan of the index table, it finds the bag-union (union-all, i.e. duplicate elements in the union are allowed) of doc_ids matching either t1, t2, . . . , or tm.

Count the occurrence of each doc_id in the result set, and identity the doc_ids with count reaching M as the results.

For instance, if the search tokens are 'transaction', 'response', 'time', documents with ids 1,2,3 matches 'transaction', with ids 2,3,4,5 matches 'response', and with ids 2,3,4,5,6 matches 'time', then the union bag contains {1,2, 2,2,3,3,3,4,4,5,5,6}; documents with ids 2 and 3 matches all the tokens since they have count 3 in the union.

In this sense, the 1P scheme is match-count based. The 1P does not start with finding the document matching all the M tokens in terms M pass index scans. Instead, the 1P finds the doc_ids matching any of the M tokens as the candidates, in terms of a single pass index scan, followed by calculating the count of each doc_id in the (bag) union of the resulting doc_ids candidates. The 1P indexing scheme generally out perform the MP indexing due to the reduced index scans. The above text search query, written in the 1P scheme, may have the following shape, where the condition
    WHERE token IN ('transaction', 'response', 'time')
is generally equivalent to
    WHERE token='transaction' OR token='response' OR token='time'.

A difference between the new search engine discussed herein and other text search engines may consist in that the present engine leverages SQL queries to do text search directly, while conventional engines are generally either built from scratch, or have search operators, coded, say in C++ programming, included in the set of SQL operators. These search operators of other search engines are not built using SQL query and, therefore, do not leverage the SQL analytics power themselves. In comparison, the advantage of certain embodiments of the present techniques is that the search portal or text search engine may directly incorporate with query engine's data management capability and SQL analysis capability. In certain examples, a text-search SQL query generator may automatically (or at prompting by a user) turn a search expression to the corresponding search queries in SQL, for accessing the index tables and base-tables. In this context, specific issues of query generation may be addresses.

In SQL query based text search, the search performance may depend on the shapes of the generated search queries. A query request may typically be fulfilled by multiple queries with different shapes which deliver the same query result but with different performance. In the index-based text search, a query shape is the multi-way join of the inverse index table for identifying the document IDs matching the given search tokens. In the above query listed, given 3 tokens 'transaction', 'response', 'time', the query conducts a 3-way self-join of the index table to find the doc_ids matching all the 3 tokens. The other way to express such 3-way join is given below.

```
SELECT * FROM base_table WHERE
    unique_id IN (SELECT unique_id FROM index_table WHERE
token = 'transaction')
AND unique_id IN (SELECT unique_id FROM index_table WHERE
token = 'response')
AND unique_id IN (SELECT unique_id FROM index_table WHERE
token = 'time')
```

In SQL query-based text search, a purpose of indexing may be to find the ids of ail the documents matching the search request. In other words, the index search may provide a filter for the documents, say Cindex. Conventionally, such inverted index search is a particular independent action of text search, and may itself contribute to the cost of text search. In some cased, additional filter conditions, Cbase, may exist on the base document table, such as timestamp, other than the search request specified in the search expression, such as keywords. Applying Cbase to filter the documents may constitute another independent action of the text search.

Conventionally the text search algorithm, in SQL or not, tends to conjunct the results of these two steps as the combined filter results for text search. In this way, the document search is filtered by Cindex, but the index search is not filtered by Cbase, potentially leading to the following problems: (1) the indexing result on Cindex is large thus causes the high cost of combine it with the result on Cbase; and (2) the index search itself is costly since it must take into account all the doc_ids; this cost would be reduced if the doc_ids is filtered by Cbase.

In response, embodiments herein may employ the "handshake" mechanism in text search, to facilitate querying the base table and querying the index table to be filtered interactively using each others filter conditions. Because querying the base table may already be filtered by index search, the handshake mechanism essentially facilitates the index search to be filtered by the base table filtering result. The "handshake" combines and realizes synergy of filtering the inverse word index based on a search condition or filter condition (e.g., time period) with one-pass indexing (e.g., single scan without a multi-join) of the inverse word index or inverse index table.

As a simple example, assume the base table contains 100 M logs in 100 days, for any given search expression, the indexing step need to deal with 100 M doc_ids. However, if a condition on the base table specifies a time range of 1 day, thus the doc_ids may be filtered to roughly 1 M (instead of 100 M); if this filtering result can be taken into account by the index search, then only 1 M doc_ids should be taken into account in the indexing step. In most cases, the search queries composed under this mechanism over-perform others.

The idea of handshake text search using inverted index can be conceptually described below. The base table is denoted by T and the associated index table by X. The indexing filter condition derived from the search expression is denoted by sc; the index table is filtered by $\sigma_{sc}(X)$; then the result of index search is a set of matching doc IDs, expressed as $\pi_{id}\sigma_{sc}(X)$. The result of base table is filtered by indexing by $oid \in \pi_{id}\sigma_{sc}(X)$ (T). Handshake means plugging in base table filter condition on doc ID, $\pi_{id}(\sigma_b T)$, to the indexing sub-query to reduce index search, which expands the index search filter condition to $oid \in \pi_{id}(\sigma_b T) \wedge sc\ (X)$. With handshake, the base table is filtered by $\sigma_{id} \in \pi_{id}(\sigma\ id \in \pi_{id}(\sigma_b T) \wedge sc\ X)$ T. While the handshake idea is general, in our implementation context it is represented in different query shapes.

In the following executed Examples, the base table is 'T' identified by id, the index table is 'X' identified by <token, doc_id>. The document filter condition is defined on table 'T2' containing the meta data of the document identified by id2. The common document ID in these three tables are id, doc_id and id2. In fact 'T' and 'T2' are two projections of the original document table.

For the executed Examples, the search request contained 4 keywords, 'transaction', 'response', 'time', 'is'; the match document must contain these 4 keywords, i.e. its doc_id must be paired with these 4 tokens in the index table. In other words, for a document with ID 101, the index table should contain the following tuples:

| token | doc id |
|---|---|
| transaction | 101 |
| response | 101 |
| time | 101 |
| is | 101 |

The filler condition of document is defined on the 'T2' table, as

```
T.id IN
(SELECT DISTINCT id2 FROM T2
  WHERE TIMESTAMP BETWEEN '2014-10-09 14:18:51.359000
            +0000' AND '2014-10-16 14:18:51
  +0000' AND the_host ILIKE 'pcoe_sitescope_0310'
  AND the_host ILIKE 'pcoe_sitescope_0310')
```

The following queries with MP1, MP2 and 1P shape do not use handshake mechanism. Their respective performances (execution time) are indicated.

[MP1] 2.28 seconds
SELECT count(*) FROM
(SELECT id, message FROM T
WHERE id IN (SELECT doc_id FROM X
      WHERE token = 'transaction')
AND id IN (SELECT doc_id FROM X
      WHERE token = 'response')
AND id IN (SELECT doc_id FROM X
      WHERE token = 'time')
AND id IN (SELECT doc_id FROM X
      WHERE token = 'is')
) AS r1, (SELECT DISTINCT id2 FROM T2
  WHERE TIMESTAMP BETWEEN '2014-10-09 14:18:51.359000
+0000' AND '2014-10-6 14:18:51
  +0000' AND the_host ILIKE 'pcoe_sitescope_0310'
) AS r2
WHERE r1.id = r2.id2;
[MP2] 2.01 seconds
SELECT count(*) FROM
(SELECT id, message FROM T
  WHERE id IN (SELECT t0.doc_id FROM X t0, X t1, X t2,
    X t3 WHERE
t0.doc_id=t1.doc_id AND t1.doc_id=t2.doc_id AND
t2.doc_id=t3.doc_id AND t0.token = 'transaction' AND t1.token =
'response' AND t2.token = 'time' AND t3.token = 'is')
) AS r1,
(SELECT DISTINCT id2 FROM T2
  WHERE TIMESTAMP BETWEEN '2014-10-09 14:18:51.359000
+0000' AND '2014-10-16 14:18:51 +0000'
  AND the_host ILIKE 'pcoe_sitescope_0310'
) AS r2
WHERE r1.id = r2.id2;
[1P] 1.41 second
SELECT count(*) FROM
(SELECT id, message FROM T
  WHERE (id IN (SELECT doc_id FROM (SELECT doc_id, count(*)
AS count FROM X
  WHERE token IN ('transaction', 'response', 'time', 'is') GROUP BY
doc_id) r WHERE count>=4))
) AS r1,
(SELECT DISTINCT id2 FROM T2
  WHERE TIMESTAMP BETWEEN '2014-10-09 14:18:51.359000
+0000' AND '2014-10-16 14:18:51 +0000'
  AND the_host ILIKE 'pcoe_sitescope_0310'
) as r2
WHERE r1.id = r2.id2;

The following queries are the counterparts of the above queries under the handshake mechanism.

[MP1 with Handshake] 1.90 second
SELECT count(*) FROM
(SELECT id, message FROM T
WHERE id IN (SELECT DISTINCT id2 FROM T2
  WHERE TIMESTAMR BETWEEN '2014-10-09 14:18:51.359000
+0000' AND '2014-10-16 14:18:51
    +0000' AND the_host ILIKE 'pcoe_sitescope_0310')
AND id IN (SELECT doc_id FROM X
      WHERE token = 'transaction')
AND id IN (SELECT doc_id FROM X
      WHERE token = 'response')
AND id IN (SELECT doc_id FROM X
      WHERE token = 'time')
AND id IN (SELECT doc_id FROM X
      WHERE token = 'is');
[MP2 with Handshake] 1.08 second
SELECT count(*) FROM T
WHERE id IN
  (SELECT t0.doc_id FROM X t0, X t1, X t2, X t3
  WHERE t0.doc_id IN
    (SELECT DISTINCT id2 FROM T2
WHERE TIMESTAMP BETWEEN '2014-10-09 14:18:51.359000
+0000' AND'2014-10-16
14:18:51 +0000' AND the_host ILIKE 'pcoe_sitescope_0310'
  )
  AND t0.doc_id=t1.doc_id AND t1.doc_id=t2.doc_id AND
t2.doc_id=t3.doc_id
  AND t0.token = 'transaction' AND t1.token = 'response' AND
t2.token = 'time'
AND t3.token = 'is');
[1P with Handshake] 0.39 second
SELECT count(*) FROM T WHERE (id IN (SELECT doc_id FROM
(SELECT doc_id, count(*) AS count FROM X
WHERE doc_id IN (SELECT DISTINCT id2 FROM 12
      WHERE TIMESTAMP BETWEEN '2014-10-09 14:18:51.359000
+0000' AND '2014-10-16 14:18:51
      +0000' AND the_host ILIKE 'pcoe_sitescope_0310')
  AND token IN ('transaction', 'response', 'time', 'is')

```
GROUP BY doc_id) rr
WHERE count>=4));
```

From the above comparison, with the query shapes (MP1, MP2 or 1P), using handshake improved the performance because the handshake provided the target of index search to be reduced and, therefore, improve the efficiency of indexing.

| Query Shape | Regular | Handshake |
|---|---|---|
| MP1 | 2.28 sec | 1.90 sec |
| MP2 0 | 2.01 sec | 1.08 sec |
| 1P | 1.41 sec | 0.39 sec |

In the executed Examples, the handshake applied to 1P query shape resulted in the best performance. In summary, in text search, treating filter documents using inverted index and using application specific conditions, which are not specified in the search expression, as separate actions is the cause of inefficiency. In contrast, embodiments herein address this issue in SQL query-based text-search in terms of embedding SQL conditions defined on the documents into the index search and, therefore, filter the index itself for enhanced indexing efficiency. This technique may be labeled as "handshake" because the documents are filtered by index condition, and indexes are filtered by the condition defined on the documents, providing mutual benefit.

Figure 1:
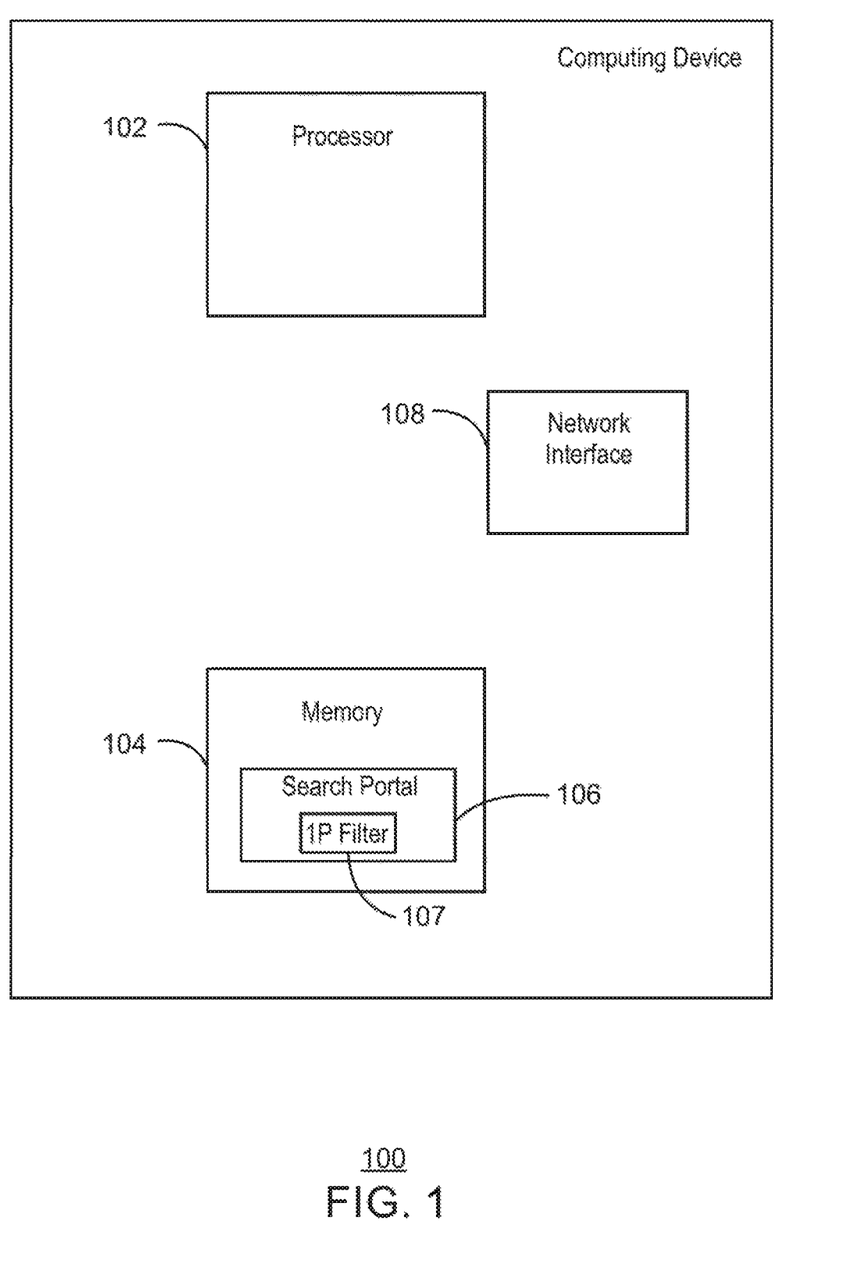
FIG. 1 is a block diagram of a server having a search portal for a database in accordance with examples.

Turning now to the drawings, FIG. 1 is a computing device 100 having a search portal 106 for a database such as a relational database having tables. The computing device 100 may be a server, data server, blade server, host device, client computer, personal computer (PC), laptop, portable device, storage controller, storage array controller, disk array controller, disk array system, or other type of computing system. The search portal 106 may be a text search engine that employs one-pass indexing and other techniques discussed herein in a text search of the database (e.g., database 202 of FIG. 2). The computing device 100 includes a processor 102 and memory 104 storing the search portal 106. The search portal 108 may be a text search engine stored as instructions (e.g., code, logic) executable by the processor 102. The search portal includes a 1P filter 107 which is stored instructions (e.g., code, logic) executable by the processor 102 to perform in conjunction a one-pass indexing (1P) of an inverse word index combined with filtering of the inverse word index based on a search condition (filter condition) such as a time window or other condition.

The processor 102 may be a microprocessors a central processing unit or CPU, a controller, a storage controller, or other type of hardware processor. Moreover, the processor 102 may be multiple processors and/or may have multiple cores, and may have cache memory, integrated graphics, and so forth. The memory 104 may include nonvolatile memory, volatile memory, a hard drive, read only memory (ROM), system memory, random access memory (RAM), cache memory, and the like. Further, the computing device 100 may include a network interface 108 to couple to a database (not shown). The network interface 108 may include a network controller, network interface circuitry, a network interface card (NIC), an input/output (I/O) controller, a host bust adapter (HBA), disk controller, disk array controller, and/or a storage controller or other controller, and so on.

As discussed, the executable instruction or code as the search portal 106 or text search engine may provide for a text search of a database. The search portal 106 may receive both a text search expression and a search (filter) condition. The search portal 106 may convert the text search expression into a query or query plan. For example, search portal 106 may be executed by the processor 102 to convert, via the text-search query generator, the received text search expression to a search query plan (e.g., in SQL) to access the index table and base tables of the database. Thus, the search portal 106 may provide for direct leveraging of SQL operators in the text search. The search portal 106 having the 1P filter 107 may implement the query plan via one-passing indexing (a single scan) of an inverse index table(s) or inverse word index of the database. Indeed, the instructions or code as the search portal 108 may be executed by the processor 102 to employ a single-pass of the inverse word index. The one-pass indexing may first filter the inverse word index based on the received search condition to determine the applicable documents for the text search. Moreover, as discussed, the single pass may be a match-count based scan and may give a union or bag-union of a list of the applicable documents. A "handshake" or synergy may be realized by combining the action of filtering the inverse word index based on the search condition with the action of match-count based scan.

In particular examples, the search portal 106 as executed via the processor 102 may interact or coordinate with a database management system associated with the database. In some examples, the computing device 100 may be part of the database, such as a database server of the database, and with the executable code composing the search portal 106 incorporated with database operations software or a database management system, and the like. Lastly, while FIG. 1 represents a computing device 100 such as a server, the processors(s) 102 and memory having the stored executable code (search portal 106) may instead or additionally be in a distributed computing system such as across multiple compute nodes.

A database stores information such that the information can be retrieved. As discussed, a relational database may present information in tables with rows and columns. A table is referred to as a relation in the sense that the table may be a collection of objects of the same type (rows). Data in a table can be related according to common keys or concepts, and the ability to retrieve related data from a table may be a basis for the term relational database. Indeed, a relational database is a collection of data items organized as a set of tables from which data can be accessed or reassembled. SQL statements may be used both for interactive queries for information from a relational database and for gathering data for reports. Each table (sometimes called a relation) contains one or more data categories in columns (e.g., fields). Each row (e.g., record or tuple) generally contains a unique instance of data for the categories defined by the columns.

Access to these data is usually provided by a "database management system" (DBMS) which may consist of an integrated set of computer software that facilitates users to interact with one or more databases and provides access to the data contained in the database (although restrictions may exist that limit access to particular data). The DBMS may serve as the intermediary between the user and the database. The DBMS provides various functions that facilitate entry, storage and retrieval of information and provides ways to manage how that information is organized. Because of the close relationship between them, the term "database" is often used casually to refer to both the database and the DBMS used to manipulate the database. A database system may refer collectively to at least the database model, database management system, and database. In sum, a DBMS may handle the way data is stored, maintained, and retrieved. In the case of a relational database, a Relational Database Management System (RDBMS) performs these tasks. The term DBMS may be used as a general term that includes RDBMS.

Figure 2:
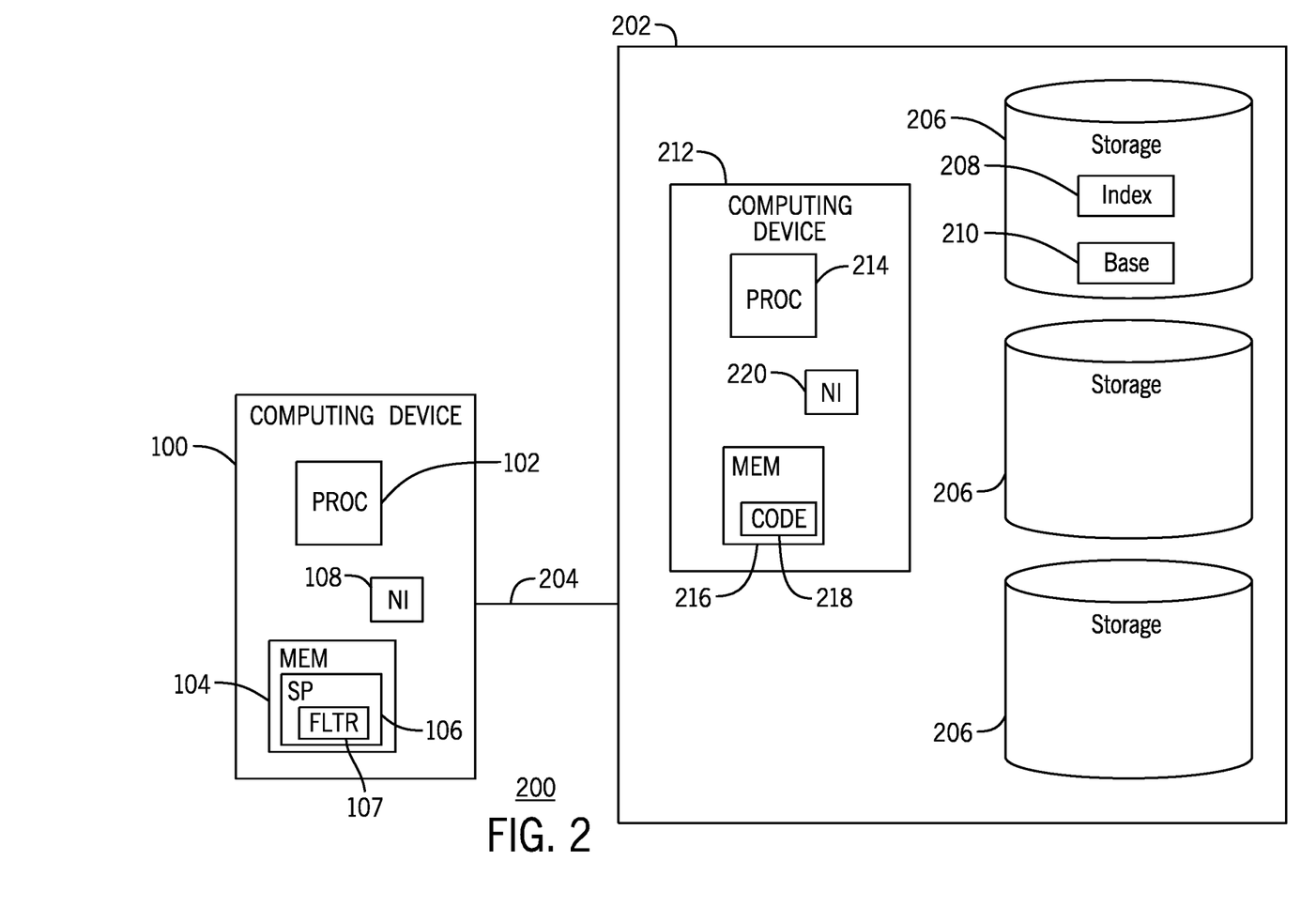
FIG. 2 is a block diagram of a database system having server of FIG. 1 and a database in accordance with examples.

FIG. 2 is a database system 200 having the computing device 100 of FIG. 1 and a database 202. The computing device 100 is coupled to the database 202, as indicated by line 204. The database 202 may be a relational database and/or other type of database. The database 202 generally includes multiple storage devices 208 (e.g., nonvolatile memory, hard drives, disk drives, solid state drives, etc.). The storage devices 208 may be at one geographic location and/or dispersed across different geographic locations.

The storage devices 206 may store the data of the database. The information and data stored in the database in storage devices 206 may be in documents and tables (rows, columns). Moreover, the database 202 generally includes both index tables 208 and the base tables 210 of data. The number of base tables 210 can range up to thousands or greater. The index tables 208 may include inverted index tables which are employ in embodiments of the present techniques.

The database 202 may include a database computing device 212 (e.g., a database server) that manages and provides an interface to the database 202 and the database storage devices 208. The database computing device 212 may include a processor 214 and memory 216. The processor 212 may be multiple processors and/or may have multiple cores, and may have cache memory, integrated graphics, and so forth. The memory 216 may include nonvolatile memory, volatile memory, a hard drive, read only memory (ROM), system memory, random access memory (RAM), cache memory, and the like.

The memory 216 may store code 218 (e.g., instructions, logic, etc.) executable by the processors(s) 214. The code 218 may include a DBMS. As discussed, a DBMS may be a computer software application that interacts with the user, other applications, and the database itself to capture and analyze data. A general-purpose DBMS may facilitate the definition, creation, querying, update, and administration of databases. Of course, application software other than a DBMS may provide access to the data in a database. Also, a DBMS may employ a standard operating system. Moreover, a DBMS may be referred to as part of the database. A DBMS may be the software that facilitates storage, retrieval, deletion, security, and integrity of data within a database. An RDBMS is a DBMS which manages a relational database.

Further, the cods 218 may include a conventional search engine as well as the search portal 106 (having the 1P filter 107) discussed herein. In some examples, the computing device 100 may be employed as the database computing device 212 having the DBMS. The database computing device 212 may include a network interface 220 to couple with external networks, the computing device 100, the storage devices 306, and so on. The network interface 108 may include a network controller, network interface circuitry, a network interface card (NIC), an input/output (I/O) controller, a host bust adapter (HBA), disk controller, disk array controller, and/or a storage controller or other controller, and so on.

The database system 200 depicted in the illustrated embodiment of FIG. 2 may employ the techniques discusses herein. As discussed, the search portal 106 may provide for a text search of the database 202. The search portal 106 may receive a text search expression and a search condition. The search portal may convert the received text search expression into a query or query plan. The search portal 106 may include a text-search query generator that when executed by the processor 102 or 214 to convert (rewrite, transform, process, etc.) the received text search expression to a search query plan (e.g., in SQL) to access the inverse word index 208 and base tables 210 of the database 202. Thus, as mentioned, the search portal 106 may provide for direct leveraging of SQL operators in the text search.

The search portal 106 and its 1P filter 107 executed by the processor 102 (or 214) may apply a "handshake" technique in implementing the text search via a one-pass indexing of an inverse word index(es) 208 (e.g., inverse index table(s)) of the database 202. In other words, the one-pass indexing (single scan) implemented by the search portal 106 may in conjunction both filter the inverse word index based on the search (filter) condition, and employ a match-count based scan of the inverse word index 208 as filtered. Thus, a synergy may be realized.

An embodiment includes a computing device for a text search of a database (e.g., a relational database) having documents. The computing device includes a processor, a network interface to couple the computing device to a database, and memory storing a search portal executable by the processor. The search portal receives a text search expression (e.g., having multiple words) for a text search of the database. The search portal also receives a search condition. The search portal converts (e.g., via a text-search SQL query generator) the text search expression to a query plan (e.g., a SQL query plan) involving multiple search tokens. Further, the search portal implements the text search as the query plan on the database, including to perform a one-pass indexing comprising a single scan of an inverse word index of the database. The one-pass indexing includes filtering the inverse word index to determine applicable documents of the database satisfying the search condition, and identifying the applicable documents having the multiple search tokens. Additionally, the search portal may retrieve the applicable documents (satisfying the search or filter condition) having the multiple search tokens. Moreover, in certain examples, performing the one-pass indexing does not include performing a multi-pass scan or a self-join of the inverted index table.

In a particular example the multiple search tokens include a first search token and a second search token. The first search token is a first word of the text search expression, and the second search token is a second word of the text search expression. To perform the one-pass indexing includes to identify and count applicable documents of the database matching the first search token to give a first set of a list of documents, and to identify and count documents of the database matching the second search token to give a second set of list of documents. The one-pass index scan may further include to combine the first set with the second set to give a union bag to identify applicable documents that contain the first search token and the second search token.

Another embodiment includes a computing device for a text search of a database, the computing device comprising: a processor; a network interface to couple the computing device to a database; and memory storing a search portal to: accept a text search expression and a search condition for a text search of a database; rewrite the text search expression into a query plan comprising multiple search tokens; and implement the text search as the query plan on the database, including applying a one-pass indexing comprising a scan of an inverse index table of the database. The search portal may be a text search engine. The one-pass indexing includes: filtering the inverse index table to ascertain applicable documents of the database meeting the search condition; and determining the applicable documents having the multiple search tokens. In examples, the search portal to retrieve the applicable documents having the multiple search tokens, wherein applying the one-pass indexing does not comprise performing a multi-pass scan or a self-join of the inverted word index. In examples, the multiple search tokens comprise a first search token and a second search token, wherein to apply the one-pass indexing comprises to determine and count the applicable documents of the database matching the first search token to give a first set of a list of documents, and to determine and count the applicable documents of the database matching the second search token to give a second set of list of documents. In examples, the one-pass indexing comprising the scan comprises to combine the first set with the second set to give a union bag to determine documents that contain the first search token and the second search token. In examples, the text search expression comprises two words, wherein the first search token is a first word of the text search expression, and the second search token is a second word of the text search expression, and wherein applicable documents listed in the union bag having a count of two are determined as applicable documents that contain the first search token and the second search token. Lastly, in examples, the database comprises a relational database, wherein the query plan comprises a structured query language (SQL) query plan, wherein the search portal comprises a text-search SQL-query generator to rewrite the text search expression into the SQL query plan that directly utilizes SQL operators in the text search implemented as the SQL query plan.

Figure 3:
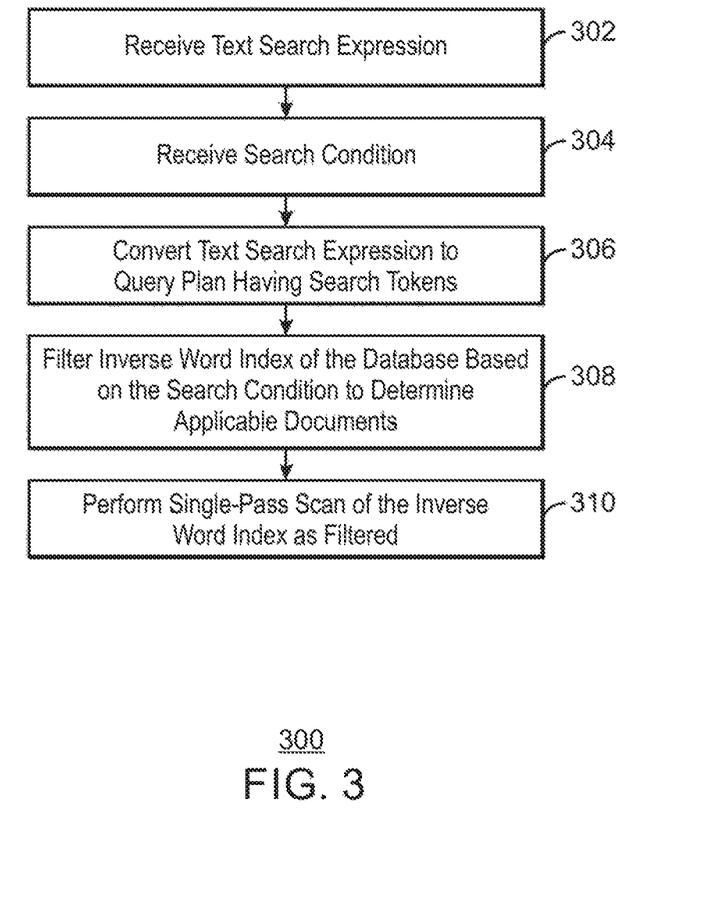
FIG. 3 is a block diagram of a method of a text search of a database in accordance with examples.
Figure 3A:
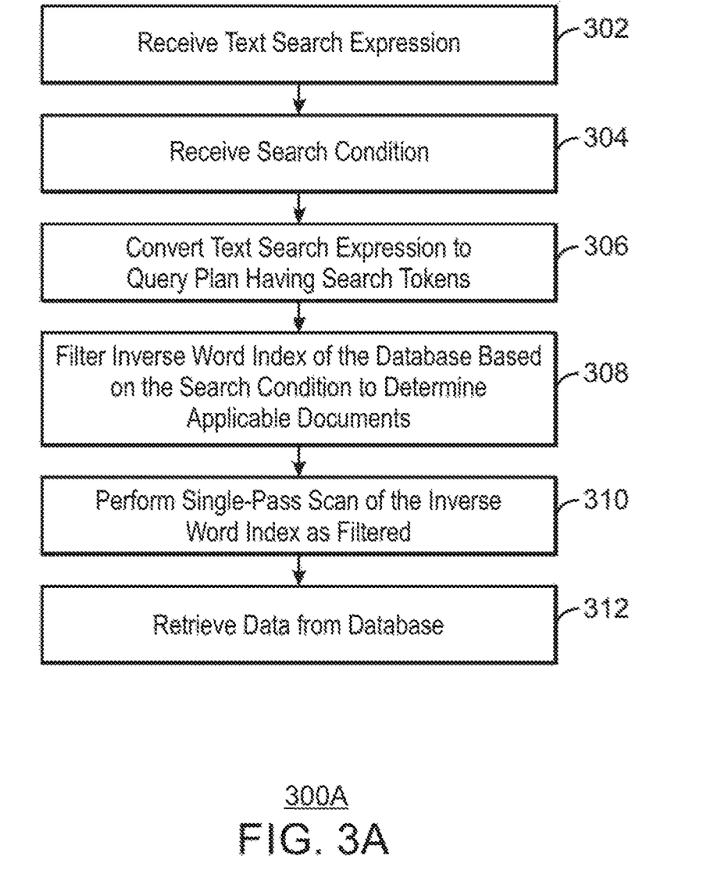
FIG. 3A is a block diagram of a method of a text search of a database in which data is retrieved in accordance with examples.

FIGS. 3 and 3A are methods 300 and 300A, respectively, of a text search of a database (e.g., a relational database) having documents. At block 302, the method includes receiving a text search expression for a text search of the database. At block 304, the method includes receiving a search condition. At block 308, the method converts the text search expression to a query plan (e.g., a SQL query plan) including multiple search tokens. In some examples, the converting of the text search expression to a query plan includes converting, via a text-search SQL-query generator, the text search expression into the SQL query plan to provide for direct leveraging of SQL operators in the text search.

At block 308, the method includes filtering an inverse word index (e.g., inverse index table) of the database based on the search condition to determine applicable documents. In other words, the lists of documents are filtered based on the search condition to give an applicable list of documents satisfying the search condition and thus are applicable to the search.

At block 310, the method includes implementing the text search as the query plan on the database, including performing one-pass indexing comprising a single scan of an inverse index table associated with the database to identify applicable documents in the database having the multiple search tokens. In some example, performing the one-pass indexing does not include performing a multi-pass scan or a self-join of the inverted index table. At block 312, the method includes retrieving the applicable documents having the multiple search tokens.

In a particular example, the multiple search tokens include a first search token and a second search token, wherein the text search expression has multiple words, wherein the first search token is a first word of the text search expression, and the second search token is a second word of the text search expression. In this example, performing the one-pass indexing includes identifying and counting applicable documents (index as filtered) of the database matching the first search token to give a first set of a list of applicable documents, and identifying and counting documents of the database matching the second search token to give a second set of list of applicable documents. Further, implementing the text search and performing the one-pass index scan may include combining the first set with the second set to give a union bag. In a specific example, the text search expression includes two words, wherein applicable documents in the union bag having a count of two are documents that contain the first search token and the second search token.

Some embodiments include a method of text search of a database, comprising: receiving a text search expression and a search condition for a text search of a database comprising documents; converting the text search expression to a query plan comprising multiple search tokens; and performing, based on the query plan, a one-pass indexing comprising a single scan of an inverse word index of the database, the one-pass indexing comprising: filtering the inverse word index to determine applicable documents of the database satisfying the search condition; and identifying the applicable documents having the multiple search tokens. The implementing of the text search of the database may comprise: implementing the query plan on the database; and retrieving the documents having the multiple search tokens, wherein performing the one-pass indexing does not comprise performing a multi-pass scan or a self-join of the inverted word index (or inverse word index or inverse index table, etc.). The method may include: the multiple search tokens comprises a first search token and a second search token; the text search expression comprises multiple words, wherein the first search token is a first word of the text search expression, and the second search token is a second word of the text search expression; and identifying the applicable documents having the multiple search tokens comprises: identifying and counting the applicable documents matching the first search token to give a first set of a list of applicable documents; and identifying and counting the applicable documents of the database matching the second search token to give a second set of list of applicable documents. The method may include implementing the text search as the query plan, wherein performing the one-pass index scan comprises combining the first set with the second set to give a union bag. The method may include the text search expression comprises two words, wherein the applicable documents listed in the union bag having a count of two are identified as applicable documents that contain the first search token and the second search token. In examples, the database comprises a relational database, wherein the query plan comprises a structured query language (SQL) query plan, wherein converting the text search expression to a query plan comprises converting, via a text-search SQL-query generator, the text search expression into the SQL query plan to provide for direct leveraging of SQL operators in the text search.

Figure 4:
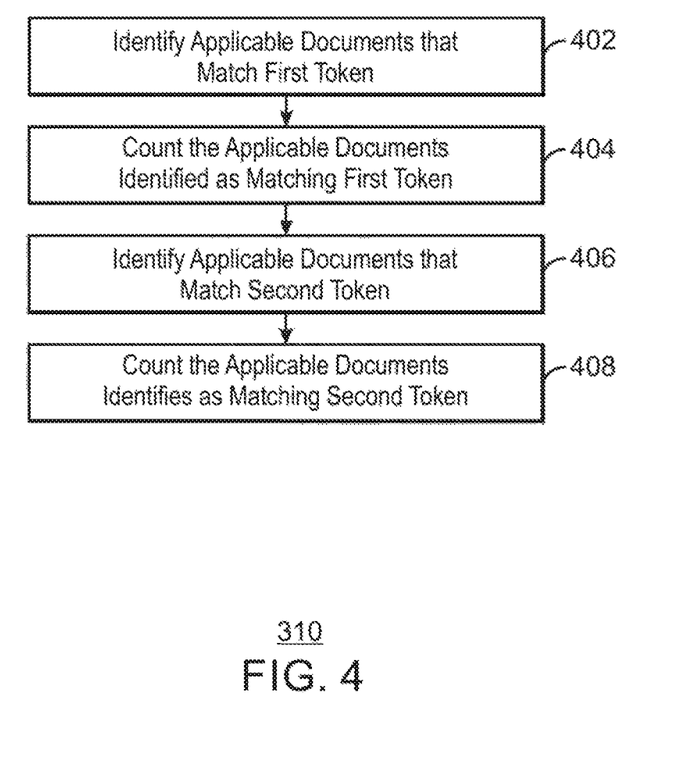
FIG. 4 is a block diagram of a method of one-pass indexing in accordance with examples.

FIG. 4 is an example method 310 of the one-pass indexing of an inverted word index with respect to the method 300 of FIG. 3. The method of performing the one pass indexing in this illustrated embodiment may include performing a single scan (and not additional or multi-pass scans) of the inverted word index. Indeed, certain embodiments, no more than one single scan is performed for the text search. At block 402, the single scan includes identifying applicable documents (documents satisfying the search condition discussed above)

that match a first search token of the query plan. At block 404, the single scan includes counting the applicable documents identified as matching the first search token. At block 406, the single scan includes identifying applicable documents that match a second search token of the query plan. At block 408, the single scan includes counting the applicable documents identified as matching the second search token. Thus, the one pass indexing provides for a match-count scan in the single scan. The two respective sets of lists of applicable documents may be combined to give a union, and wherein in certain examples, a count of two for an applicable document may indicate that applicable document contains both the first search token and the second search token.

Figure 5:
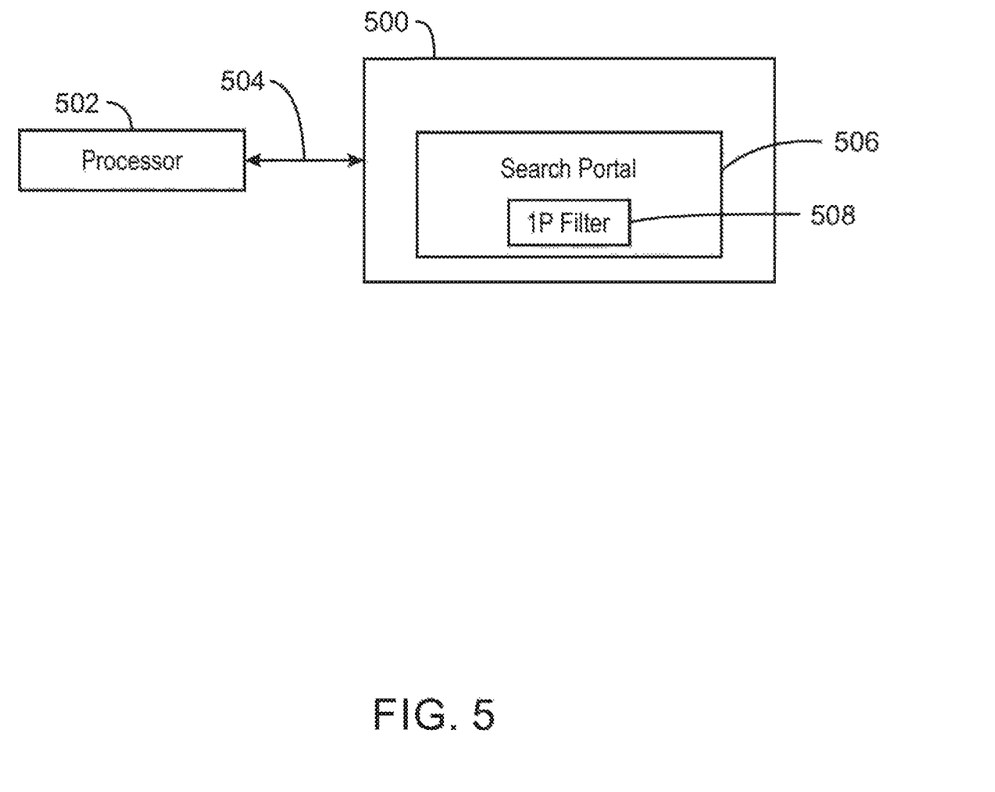
FIG. 5 is a block diagram showing a tangible, non-transitory, computer-readable medium that stores code configured to direct a processor to perform a text search of a database including one-pass indexing in accordance with examples.

FIG. 5 is a block diagram showing a tangible, non-transitory, computer-readable medium that stores code including a search porta to perform a text search of a database including one-pass indexing. The computer-readable medium is referred to by the reference number 600. The computer-readable medium 500 can include RAM, a hard disk drive, an array of hard disk drives, an optical drive, an array of optical drives, a non-volatile memory a flash drive, a digital versatile disk (DVD), or a compact disk (CD), among others. The computer-readable medium 500 may be accessed by a processor 502 over a computer bus 504. Furthermore, the computer-readable medium 500 may include code configured to perform the methods and techniques described herein. The various software components discussed herein may be stored on the computer-readable medium 500. A portion 506 of the computer-readable medium 500 can include a text search portal or text search engine, which may be executable code that directs a processor or controller in performing a text search on a database, including one-pass indexing/filtering 508 of an inverted index table of the database. The computer readable medium 500 may be the memory 104 in the computing device 100 of FIGS. 1 and 2, and/or the memory 216 in the computing device 212 of FIG. 2, and so forth. The computer readable medium 500 may include the code 106 (including 107) and/or 218 executed by a processor 102 or 214 of FIGS. 1 and 2.

An example includes a tangible, non-transitory, computer-readable medium having instructions including a search portal that direct a processor to receive a text search expression for a text search of a database (e.g., relational database) having documents. The search portal also receives a search (or filter) condition. The instructions as the search portal direct the processor to convert the text search expression to a query plan (e.g., a SQL query plan) involving multiple search tokens. The instructions as the search portal may include a text-search SQL-query generator to direct the processor to convert the text search expression into the SOL query plan such that when the query plan is implemented, SQL operators are directly applied in the text search executed as the SQL query plan. The instructions as the search portal may direct the processor to implement the text search as the query plan on the database, including to perform a one-pass indexing comprising a single scan of an inverse word index of the database. The one-pass indexing includes filtering the inverse word index to determine applicable documents of the database satisfying the search condition, and identifying the applicable documents having the multiple search tokens. The instructions including the search portal may direct the processor to retrieve the applicable documents having the multiple search tokens. Moreover, in certain examples, performing the one-pass indexing does not comprise performing a multi-pass scan or a self-join of the inverted index table.

Another example includes a tangible, non-transitory, computer-readable medium composing instructions comprising a search portal that direct a processor to: receive a text search expression and a filter condition for a text search of a database, wherein the search portal comprises a text, search engine; transform the text search expression to a query plan comprising multiple search tokens; and implement a one-pass indexing comprising a single scan of an inverse word index of the database, the one-pass indexing comprising: filtering the inverse word index to determine documents of the database satisfying the filter condition; and identifying the documents having the multiple search tokens. In particular examples, the instructions comprising the search portal to direct the processor to retrieve the documents having the multiple search tokens, wherein implementing the one-pass indexing scan does not comprise performing a multi-pass scan or a self-join of the inverted word index. Also, the database may comprise a relational database, wherein the query plan comprises a structured query language (SQL) query plan, wherein the instructions comprising the search portal comprise a text-search SQL-query generator to direct the processor to transform (process, convert, rewrite) the text search expression info the SQL query plan that directly applies SQL operators in the text search implemented as the SQL query plan.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
   receiving a text search expression and a search condition for a text search of a database comprising documents;
   converting the text search expression to a query plan comprising multiple search tokens, wherein each search token corresponds to a word of the text search expression;
   filtering an inverse word index of the database based on the search condition to determine applicable documents of the database that satisfy the search condition;
   identifying and counting each document of the applicable documents when the document matches any search token of the multiple search tokens;
   identifying documents among the counted documents that have a count equal to a number of search tokens included in the multiple search tokens; and
   generating a result of the text search including the documents that have the count equal to the number of search tokens.

2. The method of claim 1, further comprising:
   retrieving, from the database, the documents having the count equal to the number of search tokens included in the multiple search tokens.

3. The method of claim 1, wherein:
   the multiple search tokens comprise a first search token corresponding to a first word of the text search expression and a second search token corresponding to a second word of the text search expression, and
   the identifying and counting comprises:
      identifying and counting the applicable documents that match the first search token to generate a first set of applicable documents, and identifying and counting the applicable documents that match the second search token to generate a second set of applicable documents.

4. The method of claim 3, further comprising:
combining the first set with the second set to generate a union bag of applicable documents.

5. The method of claim 4, wherein the number of search tokens is two, and
wherein identifying the documents that have the count equal to the number of search tokens comprises identifying the applicable documents in the union bag that have a count of two as applicable documents that match both the first search token and the second search token.

6. The method of claim 1, wherein the database comprises a relational database, wherein the query plan comprises a structured query language (SQL) query plan, and wherein the converting comprises converting, via a text-search SQL-query generator, the text search expression into the SQL query plan to provide for direct leveraging of SQL operators in the text search.

7. The method of claim 1, wherein the identifying and counting comprises:
for each search token of the multiple search tokens, performing a one-pass scan of the inverse word index of the database to identify the applicable documents that match the search token.

8. A computing device comprising:
a processor;
a network interface to couple the computing device to a database; and
memory to store instructions that, when executed by the processor, cause the processor to:
accept a text search expression and a search condition for a text search of the database;
rewrite the text search expression into a query plan comprising multiple search tokens, wherein each search token corresponds to a word in the text search expression; and
filter an inverse index table of the database based on the search condition to ascertain applicable documents of the database that satisfy the search condition;
identify and count each document of the applicable documents when the document matches any search token of the multiple search tokens;
identify documents among the counted documents that have a count equal to a number of search tokens included in the multiple search tokens; and
generate a result of the text search including the documents that have the count equal to the number of search tokens.

9. The computing device of claim 7, wherein the instructions, when executed by the processor, further cause the processor to:
retrieve, from the database, the documents that have the count equal to the number of search tokens included in the multiple search tokens.

10. The computing device of claim 8, wherein the multiple search tokens comprise a first search token corresponding to a first word in the text search expression and a second search token corresponding to a second word in the text search expression, and
wherein the instructions that cause the processor to identify and count each document when the document matches any search token include instructions that cause the processor to:

identify and count the applicable documents of the database matching the first search token to generate a first set of applicable documents, and
identify and count the applicable documents of the database matching the second search token to generate a second set of applicable documents.

11. The computing device of claim 10, wherein the instructions further cause the processor to:
combine the first set with the second set to generate a union bag of applicable documents to determine documents that match both the first search token and the second search token.

12. The computing device of claim 11, wherein, to determine documents that match both the first search token and the second search token, the instructions cause the processor to:
identify the applicable documents in the union bag that have a count of two.

13. The computing device of claim 8, wherein the database comprises a relational database, wherein the query plan comprises a structured query language (SQL) query plan, and wherein the instructions, when executed by the processor, further cause the processor to rewrite the text search expression into the SQL query plan that directly utilizes SQL operators in the text search implemented as the SQL query plan.

14. The computing device of claim 8, wherein the instructions that cause the processor to identify and count each document of the applicable documents when the document matches any search token of the multiple search tokens include instructions that cause the processor to:
for each search token of the multiple search tokens, perform a one-pass scan of the inverse index table of the database to identify the applicable documents that match the search token.

15. A tangible, non-transitory, computer-readable medium comprising instructions that, when executed by a processor, cause the processor to:
receive a text search expression and a filter condition for a text search of a database by a text search engine;
transform the text search expression to a query plan comprising multiple search tokens, wherein each search token corresponds to a word in the text search expression;
filter an inverse word index based on the filter condition to determine applicable documents of the database that satisfy the filter condition;
identify and count each document of the applicable documents when the document matches any search token of the multiple search tokens;
identify documents among the counted documents that have a count equal to a number of search tokens included in the multiple search tokens; and
generate a result of the text search including the documents that have the count equal to the number of search tokens.

16. The tangible, non-transitory, computer-readable medium of claim 15, wherein the instructions, when executed by the processor, further cause the processor to retrieve, from the database, the documents that have the count equal to the number of search tokens included in the multiple search tokens.

17. The tangible, non-transitory, computer-readable medium of claim 15, wherein the database comprises a relational database, wherein the query plan comprises a structured query language (SQL) query plan, and wherein the instructions, when executed by the processor, further cause the processor to transform the text search expression into the SQL query plan that directly applies SQL operators in the text search implemented as the SQL query plan.

18. The tangible, non-transitory, computer-readable medium of claim 15, wherein the instructions that cause the processor to identify and count each document of the applicable documents when the document matches any search token of the multiple search tokens include instructions that cause the processor to:
   for each search token of the multiple search tokens, perform a one-pass scan of the inverse word index of the database to identify the applicable documents that match the search token.

* * * * *